United States Patent [19]

Murphy et al.

[11] 4,122,053
[45] Oct. 24, 1978

[54] ELECTRODEPOSITABLE MICELLAR DISPERSIONS

[75] Inventors: Edward J. Murphy, Pittsburgh; Ivan G. Troup, Sarver, both of Pa.

[73] Assignee: PPG Industries, Inc., Pittsburgh, Pa.

[21] Appl. No.: 399,912

[22] Filed: Sep. 24, 1973

Related U.S. Application Data

[62] Division of Ser. No. 170,805, Aug. 11, 1971, abandoned.

[51] Int. Cl.$^2$ .................. C08K 5/04; C08L 61/28; C25D 13/06; C25D 13/10
[52] U.S. Cl. .................. 260/29.4 UA; 260/18 R; 260/18 EP; 260/21; 260/23 EP; 260/27 R; 260/29.2 EP; 260/29.2 R; 260/29.6 RB; 260/29.6 MN; 260/29.6 ME; 204/181 C
[58] Field of Search ........... 260/18 EP, 29.2 E, 18 R, 260/21, 23 EP, 27 R, 29.4 UA, 29.6 RB, 29.6 MN, 29.6 ME; 106/316, 311; 204/181

[56] References Cited

U.S. PATENT DOCUMENTS

| | | | |
|---|---|---|---|
| 3,230,162 | 1/1966 | Gilchrist | 204/181 |
| 3,679,615 | 7/1972 | Gilchrist | 204/181 |
| 3,991,028 | 11/1976 | Irwin et al. | 260/29.4 UA |

FOREIGN PATENT DOCUMENTS

| | | | |
|---|---|---|---|
| 1,040,016 | 8/1966 | United Kingdom | 204/181 |
| 1,149,153 | 4/1969 | United Kingdom | 204/181 |
| 1,160,562 | 8/1969 | United Kingdom | 204/181 |
| 1,174,638 | 12/1969 | United Kingdom | 204/181 |
| 1,186,433 | 4/1970 | United Kingdom | 204/181 |
| 1,217,002 | 12/1970 | United Kingdom | 204/181 |

*Primary Examiner*—Allan Lieberman
*Attorney, Agent, or Firm*—William J. Uhl

[57] ABSTRACT

Base neutralized electrodepositable coating compositions which may be utilized in a continuous electrophoretic process without the necessity of employing membrane controls. Such coating compositions are micellar dispersions comprising a resinous vehicle which is blended or admixed with an organic liquid dispersant, said dispersant having limited solubility in water and a limited affinity for the electrodepositable vehicle, and whereby the admixture is subsequently partially neutralized with a base. Such compositions when cured provide for coatings having good salt spray resistance, mar resistance, appearance, and other desirable physical characteristics.

10 Claims, 1 Drawing Figure

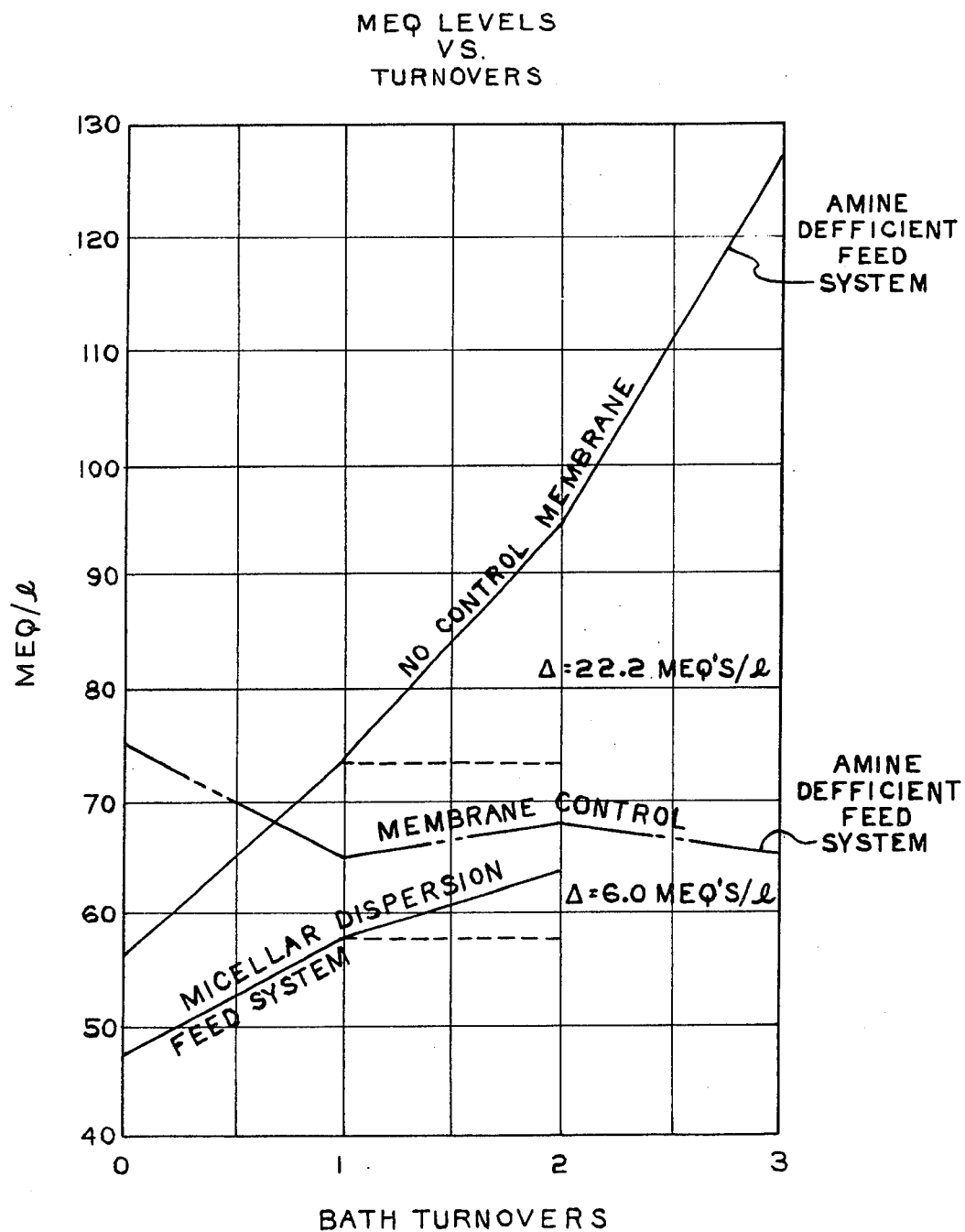

ELECTRODEPOSITABLE MICELLAR DISPERSIONS

This is a division of application Ser. No. 170,805, filed Aug. 11, 1971 and now abandoned.

BACKGROUND OF THE INVENTION

The art of electrocoating has been emerging for some time and has now become an important method of providing industrial decorative and protective finishes. The coatings achieved have excellent properties for many applications and electrodeposition results in a coating which does not run or wash off during baking. Virtually any conductive substrate may be coated by electrodeposition. The most commonly employed substrates include the base metals such as iron, steel, aluminum, copper, zinc, brass, tin, nickel and chromium, as well as other metals and pretreated metals; impregnated paper or other substrates rendered conductive under the conditions employed may also be coated.

Since the advent of electrocoating, organic polymer researchers have intensely investigated various means by which stability may be both maintained and controlled. For example, U.S. Pat. No. 3,496,083 employs an improved method for forming a coating film in which cloth of vegetable fibers is used as a diaphragm to remove alkaline cations into a cathode compartment, and then removing the alkaline cations to outside the electrodeposition bath. U.S. Pat. No. 3,419,488 employs an electrode which is separated from the aqueous dispersion or solution by an ion-exchange membrane selectively permeable to ions attracted to the counter-electrode. Both of these patents maintain stability by purging, from the bath, excess ion buildup. U.S. Pat. No. 3,576,728 provides for the preparation of a stable emulsion by mixing an insoluble non-ionizable organic material (acid value below 15), a polar dispersing agent, and alkaline water. These emulsions are useful for coating self-terminating polymer films on conducting substrates. The electrodeposition baths can be replenished from a concentrate material without any disproportionate buildup of bath components.

These methods, while useful in many cases, are not always satisfactory because when an ionizable organic resin, which has been neutralized with a metal hydroxide, is employed, even the use of fiber diaphragms and ion exchange membranes are often not sufficient to maintain bath stability.

DESCRIPTION OF THE INVENTION

Now it has been discovered that certain stable, partially-neutralized, electrodepositable coating compositions may be utilized in a continuous electrophoretic process without the need to employ a membrane control system as has been employed heretofore, particularly with KOH and NaOH neutralized electrodepositable compositions. This invention provides electrodepositable micellar dispersion coating compositions comprising a resinous vehicle which is blended or admixed with an organic liquid dispersant, the dispersant having a limited solubility in water and preferably a limited affinity for the electrodepositable vehicle. The resinous vehicle composition-dispersant admixture is subsequently partially neutralized with a base and, when reduced with deionized water, can be electrodeposited to produce coatings which are useful for many purposes.

A number of electrodepositable compositions are known and can be employed to provide the resinous vehicle which is used in the electrodeposited coating applied according to the method of the instant invention. Virtually any water-soluble, water-dispersible, or water-emulsifiable resinous material can be electrodeposited and, if film-forming, provides a coating which may be suitable for certain purposes. Any such electrodepositable material is included among those that can be employed in the present invention, even though the coatings obtained may not be entirely satisfactory, except for certain specialized uses.

Several coating compositions are known which can be electrodeposited with especially good results to provide coatings of highly desirable properties for many widely used applications. A preferred class of coating compositions are those in which the vehicle is an at least partially-neutralized reaction product of a drying oil fatty acid ester with an alpha, beta-ethylenically unsaturated dicarboxylic acid or an anhydride of such an acid. The composition may also comprise the reaction product of the ester, acid or anhydride and one or more other ethylenically unsaturated monomers. The initial reaction products as above may also be partially reacted with an alcohol to esterify part of the carboxylic groups from the acid or anhydride prior to admixing with the dispersant herein and subsequent neutralization of all or part of the remaining acidic radicals with a base.

The fatty acid esters used to make the aforesaid vehicles are esters of fatty acids which are or can be derived from drying oils or from such sources as tail oil. (By "drying oil" is meant those oils having an iodine number of greater than 90, thus including so-called "semi-drying oils".) Examples of such esters include linseed oil, safflower oil, perilla oil, oiticia oil, sunflower oil, tall oil esters, dehydrated castor oil, fish oils, and the like.

The fatty acid ester may also be an alkyd resin prepared utilizing semi-drying or drying oil; an ester of an epoxide with such fatty acids; a semi-drying or drying oil fatty acid ester of a polyol; or semi-drying or drying oil fatty acid ester of a resinous polyol. If desired, the ester may be modified with other acids, such as saturated, unsaturated or aromatic acids, as well as with such acid materials as rosin.

The alpha, beta-ethylenically unsaturated dicarboxylic acid or anhydride may be an anhydride such as maleic anhydride or itaconic anhydride, or an unsaturated dicarboxylic acid which forms an anhydride, for example, maleic acid or itaconic acid. The acids appear to function by first forming an anhydride. Fumaric acid, which does not form an anhydride, may also be employed, as well as mixtures of any of the above acids or anhydrides. Usually the anhydride or acid employed contains from 4 to 12 carbon atoms. The reaction between the acid or anhydride and the fatty acid ester takes place readily without the use of a catalyst at temperatures between about 100° C. and about 300° C., depending primarily upon the type of fatty acid ester used.

As indicated, the reaction product can also include one or more other ethylenically unsaturated monomers in polymerized form. Essentially, any ethylenically unsaturated monomer, e.g., those containing $CH_2=C<$ groups, can be employed for this purpose, with the preferred compounds being styrene, substituted styrenes, alkyl acrylates, alkyl methacrylates, diolefins and acrylonitrile. When such an additional monomer is employed, the reaction is best carried out by first reacting the acid or anhydride with the fatty acid ester and then reacting this product with the monomer at somewhat lower temperatures.

Although the proportions of the components in the foregoing reaction products are not critical, it is preferred to utilize between about 10 percent and about 45 percent by weight of the unsaturated acid or acid anhydride with about 55 percent to about 90 percent by weight of fatty acid ester. If an ethylenically unsaturated monomer is incorporated in the reaction product, it is typically used in amounts between about 5 percent and about 35 percent by weight based upon the total weight of acid or anhydride and ester.

Compositions within this general class are described in U.S. Pat. No. 3,369,983. Another type of electrodepositable coating composition which gives desirable results are the water-dispersible coating compositions comprising at least partially neutralized interpolymers of hydroxyalkyl esters of unsaturated carboxylic acids, unsaturated carboxylic acids and at least one other ethylenically unsaturated monomer. These are employed in the composition along with an amine-aldehyde condensation product or a polyepoxide, or both, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids, such as ethacrylic acid, crotonic acid, maleic acid, or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diester of the dicarboxylic acids mentioned are included. Ordinarily, the acid and ester each comprise between about 1 percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene; but others can be utilized.

Useful compositions also include a polyepoxide, which can be any epoxide compound or mixture with an epoxy functionality of greater than 1.0. Numerous such polyepoxides are known and are described in patents such as U.S. Pat. Nos. 2,467,171; 2,615,007; 2,716,123; 2,786,067; 3,030,336; 3,053,855; and 3,075,999. Included are polyglycidyl ethers of polyphenols, such as bisphenol A, or of aliphatic polyhydric alcohols, such as 1,4-butanediol; polyglycidyl esters of polycarboxylic acids, such as diglycidyl adipate; and polyepoxides from the epoxidation of unsaturated alicyclic compounds, such as 3,4-epoxy-6-methylcyclohexylmethyl-3,4-epoxy-6-methylcyclohexanecarboxylate.

Electrodepositable compositions comprising the above interpolymers and an amine-aldehyde resin or a polyepoxide, or both, are more fully described in U.S. Pat. No. 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface-active agent, such as a polyalkylene glycol (e.g., "Carbowax"), is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl) melamine.

The alkyd-amine compositions are dispersed in water and they ordinarily contain from about 10 percent to about 50 percent by weight of amine resin based on the total resinous components.

Examples of compositions of this class are described in U.S. Pat. Nos. 2,852,475; 2,852,476; and 2,853,459.

Various other similar type resins may be employed in this invention to provide suitable compositions for many purposes.

For example, resins having acid values above 100 may be utilized successfully, for acid value is not a significant characteristic in providing the micellar dispersions of the invention herein.

The electrodepositable compositions described herein may also contain other crosslinking agents or co-curing resins. For example, amine-aldehyde condensation products may be blended with the electrodepositable vehicle before the dispersant is added.

Such amine-aldehyde condensation products are, for example, condensation products of melamine, benzoguanamine, or urea with formaldehyde, although other amino-containing amines or amides, including triazines, diazines, triazoles, guanadines, guanamines and alkyl- and aryl-substituted derivatives or such compounds can be employed, as can other aldehydes, such as acetaldehyde. The alkylol groups of the products can be etherified by reaction with an alcohol, and the products utilized can be water-soluble or organic solvent-soluble.

"Limited affinity", as that term is used herein, means that the dispersant has a swelling effect upon the electrodepositable vehicle rather than being a true solvent for said vehicle.

Co-curing resins would include other similar acrylic or epoxy ester resins which can be blended with their respective types to provide suitable compositions in many instances.

The dispersants employed with the resinous vehicle to provide the micellar dispersions of this invention include any organic liquid which has limited solubility in water and which has a limited affinity for the electrodeposition vehicle.

"Limited solubility" as that term is used herein, means that the dispersant is only slightly soluble in water. Generally dispersants are regarded as having limited solubility if they are soluble in water at 20° C. to an extent of about 50 weight percent or less.

Dispersants that may be employed in this invention include such ketones as methyl ethyl ketone, methyl n-propyl ketone, diethyl ketone, mesityl oxide, cyclohexanone, methyl isobutyl ketone, methyl n-butyl ketone, ethyl n-butyl ketone, and methyl n-amyl ketone, and the like;

ethers and polyethers, such as: ethyl ether, diethyl Cellosolve, and the like;

esters such as methyl formate, ethyl formate, methyl acetate, ethyl acetate, Cellosolve acetate, propylene carbonate, n-propyl acetate, isopropyl acetate, Cellosolve acetate, ethyl glycol diacetate, butyl carbital acetate, and the like;

alcohols, such as n-butyl alcohol, sec-butyl alcohol, 3-pentanol, cyclohexanol, methyl amyl alcohol, benzyl alcohol, methylphenylcarbinol, 2-ethyl-1,3-hexanediol, and the like;

nitrocarbons, such as nitromethane, nitroethane, 2-nitropropane, and the like;

and miscellaneous solvents such as propylene oxide, methylal, aniline, and the like.

For a more complete listing of solvents that may be employed, see *THE TECHNOLOGY OF SOLVENTS AND PLASTICIZERS* by Arthur K. Doolittle, John Wiley and Sons, Inc., New York, New York.

The amount of dispersant employed herein is not critical and may be as low as about 3.0 percent or as high as about 30 percent or higher, based on total weight of the resin solids employed. However, for purposes of this invention, the preferred amount of dispersant is from about 5 to about 20 percent based on the weight of total resin solids, for at the lower percent levels, the dispersions lack stability and at the higher percent levels, the electrical parameters of the dispersion are adversely affected. The vapor pressure of the dispersant is not critical and in many instances the vapor pressure may be sufficiently high as to permit evaporation of the dispersant from the electrocoating bath after the dispersant-containing feed has been introduced therein. In the bath there is usually sufficient free neutralizing base to keep the resin partially solubilized and in suspension.

It is believed that since the dispersant does not have good solubility in either the aqueous phase or in the resinous vehicle the resinous vehicle portion is encapsulated by a layer of dispersant. The dispersant and vehicle are generally blended together by means of a high shear disperser, for example, a Cowles mixer and the like, to provide for good micellar dispersions in the submicron region and preferably micellar dispersions having a particle size from about 0.1 to 0.2 microns. Because these micellar dispersions appear to be encapsulated by the dispersant, the particles are thus prevented from agglomerating and are less likely to be precipitable.

After the resinous vehicle and the dispersant are well mixed, a neutralizing agent is then blended in and subsequently deionized water is added to complete the dispersion.

The degree of neutralization is generally less than 100 percent and may vary somewhat depending on the viscosity and acid value of the resin employed. For example, micellar dispersions of acrylic resins have been formulated in a manner to provide for suitable electrodeposition feed compositions when neutralized at from about 5 to about 30 percent of total neutralization. Likewise, epoxy ester resins have provided useful feed compositions when neutralized at from about 20 to about 80 percent of total neutralization. Generally, the acrylic resins employed herein have a substantially higher acid value than the epoxy ester resins herein, thus the higher acid value acrylics provide for suitable compositions at a lower degree of neutralization.

A number of different neutralizing agents may be employed, for example, inorganic bases, such as metal hydroxides like potassium hydroxide, sodium hydroxide, or the like. Ammonia can be used for this purpose, as can organic bases, particularly amines. Any basic amine, including alkyl amines, cycloalkyl amines, unsaturated amines, aromatic amines, cyclic amines, diamines and substituted amines of the primary, secondary, tertiary, or quaternary amine types, including hydroxylamines, may be readily employed in this invention. However, this invention in particular is useful and preferred when metal hydroxides, such as potassium or sodium hydroxide, are utilized, because in the past membranes had to be employed to control the metal ion buildup in such cases.

The preferred method of utilizing the invention herein, is to employ the partially-neutralized micellar dispersion as a feed concentrate, that is, a feed composition having a solids content greater than that of the electrocoating bath. The feed concentrate is employed to replenish the bath solids as they are depleted during the electrodeposition process. The feed concentrate may have a solids content of from about 20 percent or lower to as high as 60 percent solids content or higher; however, for economic reasons and ease of handling, most concentrates are usually formulated at from about 25 percent to about 40 percent solids content.

The partially-neutralized micellar dispersions of this invention are generally fed into a solids depleted electrocoating bath which was initially filled with a coating composition that was devoid of a dispersant as utilized in the feed concentrate compositions. Initial fill material may be partially neutralized or completely neutralized, depending on the nature of the resin employed and also on the neutralizer. The partially-neutralized miceller dispersion feed concentrate may be introduced into the bath by means of a premix tank wherein the feed concentrate is blended and mixed with the low solids bath material and then pumped into the electrodeposition tank proper.

In those instances where it is desirable, the feed concentrate may contain pigments. The pigments can be added after the resin composition is partially neutralized and therefore ground in a conventional manner well known in the art. Likewise, it is possible to have a separate pigment paste which is devoid of dispersant and which can be added in a manner similar to that of the feed concentrate hereinabove.

The pigments that may be utilized herein may be any conventional type, comprising, for example, iron oxides, lead oxide, strontium chromate, carbon black, titanium dioxide, talc, barium sulfate, as well as color pigments such as cadmium yellow, cadmium red, chromic yellow, phthalocyanine blue, phthalocyanine green and the like. If desired, various additives such as antioxidants, surface-active agents, wetting agents, flow agents, fungicides and the like can be included.

The invention is further described in conjunction with the following examples, which are to be considered illustrative rather than limiting. All parts and percentages in the examples and throughout this specification are by weight unless otherwise indicated.

EXAMPLE I

In this example a partially-neutralized micellar dispersion was prepared comprising an acrylic resin, a melaminealdehyde condensation resin, an amine, and methyl-n-butyl ketone. The following components were blended using n-butyl ketone. The following components were blended using methy high shear agitation:

| | Parts by Weight |
|---|---|
| Acrylic resin (comprising 15.8% hydroxyethyl acrylate, 24.9% styrene, 48.9% butyl acrylate at 74.2% solids content in a solvent mixture of 74% ethyl Cellosolve, 18.5% n-butyl ether and 7.5% isopropyl alcohol.) | 505.0 |
| Ethoxymethoxymethyl melamine | 100.0 |
| Hydrolyzed Epon solution (35% solids content solution of a hydrolyzed glycidyl ether of Bisphenol A in a solvent comprising 69% by weight butyl Cellosolve and 31% by weight deionized water) | 75.8 |
| Diisopropylamine | 8.9 |
| Methyl-n-butyl ketone | 37.5 |
| Deionized water | 273.8 |

The micellar dispersion obtained had a total solids content of 50 percent. This partially-neutralized acrylic micellar dispersion composition was fed into an electrocoating bath to maintain the bath soilds during continuous operation without membrane controls.

This partially-neutralized acrylic micellar dispersion was employed along with a pigmented replenishment in maintaining an electrodeposition bath for two complete turnovers (cycles) without the use of membrane. By a complete cycle it is meant that entire solids have been turned over once, that is, the equivalent amount of initial bath solids have been deposited on articles coated and the same amount of solids have been added back to the bath to maintain the initial solids contents. The initial fill of the bath was comprised of 10% solids content of acrylic resin, ethoxymethoxymethyl melamine and hydrolyzed Epon solution. This vehicle was pigmented with titanium dioxide and silica (Syloid 161) so that the final formula had a pigment to binder ratio of 0.4:1. Diisopropylamine was employed to neutralize 50 percent to the total theoretical free carboxylic acid groups.

The pigment replenishment employed during the first cycle was comprised as follows:

| | Parts by Weight |
|---|---|
| Acrylic resin (above) | 310.0 |
| Diisopropylamine | 38.8 |
| Titanium dioxide | 850.0 |
| Silica (Syloid 161) | 30.0 |
| Deionized water | 780.0 |

This composition was ground in a pebble mill until a Hegman grind gauge reading of at least 6.0 was obtained. This pigment replenishment had the following characteristics:

| Solids content (percent) | 55 |
|---|---|
| Pigment-to-binder ratio | 4:1 |
| Neutralization (percent) | 80 |

The pigment replenishment employed during the second cycle was formulated in a manner similar to that used during the first cycle except that percent neutralization was just 50 percent, because 5 percent, based on acrylic resin solids of methyl-n-butyl ketone (dispersant), was employed.

The feed additions were made every eighth cycle to restore the solids content of the bath. The feed additions included the pigment replenishments as well as the unpigmented micellar dispersion above. The behavior during the two turnovers (cycles) of this micellar dispersion was compared with that of a similar system except that the system was a standard amine deficient feed system which employed no dispersant. The results were tabulated as follows:

| | Standard Amine Deficient Feed System | Micellar Dispersion Feed System |
|---|---|---|
| Initial fill composition, MEQ*/liter | 56 | 47.2 |
| End of first cycle, ΔMEQ/liter | 17.1 | 10.3 |
| End of second cycle, ΔMEQ/liter | 22.2 | 6.0 |
| Initial gloss (60° meter) on zinc-treated, cold-rolled steel | 79 | 78 |
| Gloss at end of First cycle (60° meter) | 74 | 70 |
| Gloss at end of second cycle (60° meter) | 60 | 69 |

*Milliequivalents of titratable amine per liter of bath composition.

It can be observed from the data that the ΔMEQ/liter, after feeding two cycles with the micellar dispersion system, is substantially less than the ΔMEQ/liter of the standard amine-deficient system. Thus, by employing micellar dispersion feed composition, the ΔMEQ/liter is prevented from building up too fast, thereby adversely affecting the coating parameters of the bath.

In the attached drawing, the numerical values tabulated for the MEQ/liter for the various baths fed by the amine-deficient feed, the micellar dispersion feed, and an amine-deficient feed which was added to bath controlled with membranes are set forth graphically versus the number of bath turnovers.

Referring now to the attached drawing, it is readily observable from the graph that the amine-deficient feed system (without membrane control) shows a rapid rise in MEQ/liter and, in fact, shows a ΔMEQ/liter during the second turnover of 22.2. During the second turnover, the change in the MEQ/liter remained relatively constant with the amine deficient system which utilized membranes to control and purge the excess amine buildup. The micellar dispersion feed system showed only a ΔMEQ/liter of 6.0 during the second turnover. This change is so small that it will not affect the coating parameters or properties of the deposited film. Thus, the novel micellar dispersions of this invention can be employed as an alternate to membrane control, which is expensive, requires considerable maintenance and, in some instances may not be satisfactory.

EXAMPLE II

This example was a white pigmented coating composition comprising the following components:

| | Parts by Weight |
|---|---|
| Example I (above) | 448.8 |
| Diisopropylamine | 11.6 |
| Pigment paste (below) | 244.0 |
| Deionized water | 2795.0 |

| Pigment Paste | Parts by Weight |
|---|---|
| Acrylic resin (as in Example I) | 444.0 |
| Diisopropylamine | 93.8 |
| Deionized water | 142.2 |
| Titanium dioxide | 1273.8 |
| Silica (Syloid 161) | 46.2 |
| Deionized water | 1000.0 |
| Amine-wetting agent solution* | 26.4 |

| | |
|---|---|
| -continued | |
| Deionized water | 200.0 |

*Solution comprising 87 weight percent of an anionic wetting agent (free acid complex of an organic phosphate ester) and 13 weight percent of diisopropylamine.

This pigment paste was ground in a ceramic ball mill until a Hegman grind gauge of about 7.0 was obtained.

This coating composition had the following characteristics:

| | |
|---|---|
| Solids content (Percent) | 10.0 |
| pH | 8.3 |
| Conductivity (micromhos) | 620 |
| MEQ*/liter | 49.4 |
| Degree of neutralization | 49.5 |

*Milliequivalents of titratable amine per liter of bath composition.

Several zinc pretreated panels were immersed in a bath of this coating composition and an electrical potential of 160 volts was applied for 90 seconds. When these coated panels were baked for 20 minutes at 350° F. films from 0.9–1.0 mil in thickness were produced. These films had good appearance and a gloss of 72 (60° gloss meter).

Thus, the micellar dispersion of the invention can be formulated in a manner so as to provide for stable coating compositions which have a low degree of neutralization, where such compositions may be employed directly to produce suitable electrodeposited films.

EXAMPLE III

A 25 percent neutralized micellar dispersion feed concentrate at 31.4 percent total solids content and containing 10 percent by weight of 2-nitropropane (dispersant) was prepared in the following manner.

To 167 parts of epoxy ester resin (a 90 percent solids content epoxy ester resin in butyl Cellosolve comprising 31.6 percent tall oil fatty acid, 45.1 percent epoxy resin glycidyl ether of Bisphenol A (Epon 1004) and 23.3 percent maleinized tall oil fatty acid adduct comprised of maleic anhydride and tall oil fatty acids), 20.5 parts of 2-nitropropane were added under high shear agitation and subsequently the micellar dispersion was partially neutralized by the addition of 5.12 parts of a potassium hydroxide solution (45 percent by weight in deionized water) and 292.4 parts deionized water. The resulting composition had a homogeneous appearance and showed no phase separation. Such composition can be fed to an electrodeposition bath composition as a concentrate and yet maintain bath stability without the necessity of employing membranes.

EXAMPLE IV

This partially-neutralized micellar dispersion was prepared in a manner similar to that of Example III except the dispersant employed was nitromethane. The components were as follows:

| | Parts by Weight |
|---|---|
| Epoxy ester resin (as in Example III) | 167.0 |
| Nitromethane | 20.5 |
| Potassium hydroxide (45 percent by weight in deionized water) | 5.12 |
| Deionized water | 292.4 |

Likewise, this composition, when incorporated into an electrodeposition bath as a feed composition maintains desirable bath stability without the need for membranes to purge excess potassium buildup in the bath.

EXAMPLE V

This example was similar to that of Example III except that the dispersant employed was Cellosolve acetate. The components were as follows:

| | |
|---|---|
| Epoxy ester resin (as in Example III) | 167.0 |
| Cellosolve acetate | 20.5 |
| Potassium hydroxide (45 percent by weight in deionized water) | 5.12 |
| Deionized water | 292.4 |

This micellar dispersion can be fed to an electrocoating bath on a continuous basis in absence of membranes.

EXAMPLE VI

This example was similar to that of Example III except that the dispersant employed was methyl isobutyl ketone. The components were as follows:

| | Parts by Weight |
|---|---|
| Epoxy ester resin (as in Example III) | 167.0 |
| Methyl isobutyl ketone | 20.5 |
| Potassium hydroxide (45 percent by weight in deionized water) | 5.12 |
| Deionized water | 292.4 |

Initially, this micellar dispersion composition was homogeneous, however, after several days aging, there appeared to be some slight separation. Such separation is of no consequence if the micellar dispersion composition is introduced into the electrocoating bath before there has been sufficient aging to cause separation in the feed composition. Thus, the composition hereinabove may be utilized to feed an electrocoating bath in a manner similar to that of the other examples.

In addition to the specific examples set forth hereinabove, numerous other combinations may be used to provide suitable compositions for many purposes. For example, the acrylic resins may employ neutralizers such as potassium or sodium hydroxide. Likewise, the acrylic compositions can use other dispersants such as 2-nitropropane, nitromethane, Cellosolve acetate, methyl isobutyl ketone or the like. Other crosslinking agents can be employed, such as kexakis(methoxymethyl)melamine, melamine, hexamethoxymethyl melamine, benzoguanamine, or the like.

In addition to the pigments used, other pigments, colored pigments and flattening pigments may be employed, such as, iron oxides, carbon black, barium sulfate, and the like.

According to the provisions of the Patent Statutes, there are described above the invention and what are now considered to be its best embodiments; however, within the scope of the appended claims, it is to be understood that the invention may be practiced otherwise than as specifically described.

We claim:

1. An electrodeposition bath feed composition comprising a partially-neutralized micellar aqueous dispersion having a particle size of from approximately 0.1–0.2 microns of an aqueous, electrodepositable, base solubilized, resinous vehicle containing a dispersant which has a solubility of 50 percent by weight or less in water at 20° C. and has a limited affinity for the resinous vehicle in that the dispersant has a swelling effect upon the resinous vehicle; the degree of neutralization of said dispersion being from about 5 to 80 percent of the total theoretical neutralization.

2. A composition as in claim 1 wherein the neutralization is accomplished by a neutralizer selected from a member of the class consisting of metal hydroxides, ammonia, and amines.

3. A composition as in claim 2 wherein the neutralizer is potassium hydroxide.

4. A composition as in claim 2 wherein the neutralizer is diisopropylamine.

5. A composition as in claim 1 wherein the dispersant is selected from a member of the class consisting of 2-nitropropane, nitromethane, Cellosolve acetate, methyl isobutyl ketone and methyl-n-butyl ketone.

6. A composition as in claim 1 wherein the resinous vehicle comprises a partially-neutralized reaction product of a drying oil fatty acid ester with an alpha, beta-ethylenically unsaturated dicarboxylic acid or an anhydride of such an acid.

7. A composition as in claim 1 wherein the resinous vehicle comprises partially-neutralized interpolymers of hydroxyalkyl esters of unsaturated carboxylic acid, unsaturated carboxylic acids and at least one other ethylenically unsaturated monomer.

8. A composition as in claim 1 wherein the resinous vehicle is comprised of from about 20 to about 60 percent by weight of a crosslinking agent.

9. A composition as in claim 8 wherein the crosslinking agent is selected from members of the class consisting of condensation products of melamine, urea and benzoguanamine.

10. An electrodeposition bath feed composition comprising a partially-neutralized micellar dispersion having a particle size from approximately 0.1–0.2 microns of an aqueous electrodepositable amine neutralized reaction product of a drying oil fatty acid ester with an alpha, beta-ethylenically unsaturated dicarboxylic acid or any anhydride of such an acid, containing methyl-ethyl ketone dispersant.

* * * * *

UNITED STATES PATENT AND TRADEMARK OFFICE
CERTIFICATE OF CORRECTION

PATENT NO. : 4,122,053

DATED : October 24, 1978

INVENTOR(S) : Edward J. Murphy and Ivan G. Troup

It is certified that error appears in the above-identified patent and that said Letters Patent are hereby corrected as shown below:

Column 2, line 31, "tail" should be --tall--.

Column 6, line 35, "miceller" should be --micellar--; line 44, "therefore" should be --thereafter--; and line 67, "melaminealdehyde" should be --melamine-aldehyde--.

Column 7, line 1, after "using" insert --methyl--; line 2, delete "methy"; and line 22, "soilds" should be --solids--.

Column 10, line 48, "kexakis" should be --hexakis--.

Signed and Sealed this

Sixteenth Day of January 1979

[SEAL]

Attest:

RUTH C. MASON
Attesting Officer

DONALD W. BANNER
Commissioner of Patents and Trademarks